United States Patent [19]

Yourick

[11] Patent Number: 4,775,935
[45] Date of Patent: Oct. 4, 1988

[54] VIDEO MERCHANDISING SYSTEM WITH VARIABLE AND ADOPTIVE PRODUCT SEQUENCE PRESENTATION ORDER

[75] Inventor: Denise A. Yourick, Gahanna, Ohio

[73] Assignee: Westinghouse Electric Corp., Pittsburgh, Pa.

[21] Appl. No.: 909,792

[22] Filed: Sep. 22, 1986

[51] Int. Cl.[4] .......................... G06F 7/24; G06F 15/21
[52] U.S. Cl. ..................................... 364/401; 364/518; 235/375
[58] Field of Search ............... 364/401, 518; 358/903, 358/102; 360/72.2; 340/706, 825.35; 434/365; 235/375, 383

[56] References Cited

U.S. PATENT DOCUMENTS

| | | | |
|---|---|---|---|
| 3,757,037 | 9/1973 | Bialek | 358/102 X |
| 4,395,740 | 7/1983 | Yuen et al. | 360/72.2 |
| 4,490,810 | 12/1984 | Hon | 364/900 |
| 4,675,755 | 6/1987 | Baumeister et al. | 358/102 X |

FOREIGN PATENT DOCUMENTS

| | | |
|---|---|---|
| 2524180 | 9/1983 | France . |
| 0110078 | 6/1985 | Japan . |
| 2105075 | 3/1983 | United Kingdom . |

OTHER PUBLICATIONS

Gatty, B. "Setting Up Shop On Computer Screens", Nation's Business, vol. 72, No. 3, Mar. 1984, 57–58.
"Retailers Beginning to Tune in Video Displays", Advertising Age, vol. 56, No. 90, Nov. 18, 1985, 66.
Videodisc: "Product Search Launched for Architects and Interior Designers" Videodisc and Optical Disk, vol. 5, No. 4, Jul. 1985, 244–247.
Riggs, L. "Direct marketing goes electronic", Sales & Marketing Management vol. 134, No. 1, Jan. 14, 1985, 59–60.
"Touchcom TM Interactive videodisc catalog markets furniture at Dayton's" videodisc & Optical Disk, vol. 5, No. 5, Sept./Oct. 1985, 343–345.
Yeazel, L. A. "Point-of-Purchase—the Decision to Buy", Optical Information Systems, vol. 6, No. 1, Jan.-/Feb. 1986, 36–37.
Hoke, P. "Comp-U-Store System Could Change Retail Economics", Direct Marketing, vol. 46, No. 3, Jul. 1983, 101–107.
Machine Learning 1, Induction of Decision Trees, J. R. Quinlan, Kluwer Academic Publishers, 1986.
Mukhopadhyay, et al., "An Intelligent System for Document Retrieval in Distributed Office Environment", Journal of the American Society for Information Science, vol. 37, No. 3, May 1986, 123–135.
Machine Learning, An Artificial Intelligence Approach, Edited by R. S. Michalski, J. G. Carbonell and T. M. Mitchell, Chapter 15, Learning Efficient Classification Procedures and Their Application to Chess End Games, J. R. Quinlan, pp. 463–482, Tioga Publishing Company 1983.

Primary Examiner—Jerry Smith
Assistant Examiner—Clark A. Jablon
Attorney, Agent, or Firm—D. C. Abeles

[57] ABSTRACT

A multimode video merchandiser system utilizes two levels of inductive learning to derive rules for selecting the sequence in which images of products stored on a videodisc are presented on a video monitor to a user. The first level of inductive learning generates rules from market survey based, consumer profile attributes assigned to items selected by previous users to determine the profile of the consumer most likely to be using the system at any given time, and to present the items in a sequence most likely to appeal to such a user. The second level of inductive learning utilizes a set of product characteristic attributes assigned to items selected by the current user to determine that user's preferences, and to modify the sequence of presentation to display first those items possessing the preferred characteristics.

16 Claims, 9 Drawing Sheets

VIDEO MERCHANDISING SYSTEM WITH VARIABLE AND ADOPTIVE PRODUCT SEQUENCE PRESENTATION ORDER

BACKGROUND OF INVENTION

1. Field of Invention

This invention relates to an apparatus and a method for displaying images of merchandise items to prospective customers in sequence and more particularly to such an apparatus and method which employ artificial intelligence to customize the presentation to most effectively address the prospective customer's interests.

2. Background Information

It is becoming common today for merchandisers to utilize video systems to generate consumer interest in their products. The typical system displays images of a number of items in a fixed sequence. Some systems allow the user to select a particular group of items for review. For instance, the user may be offered the option of viewing any one of several styles of furniture. However, even in these systems the menu of selections available is fixed and the group of products selected is always presented in the same sequence. One of these known fixed menu systems will provide specifications if more detail about an item is requested, and will check a main frame computer memory to determine if a product is available, but again the order of presentation of items is fixed.

One system in use allows the user to indicate what features of a given product are most important and then selects items for presentation based on those features. For instance, if a user is interested in television sets and indicates a particular interest in 13 inch color sets, with remote control and selling for less than a given price, the system will attempt to find items meeting those specifications for display. If none are found, the least important features are successively dropped, without the knowledge of the user, until a match is found. Again, however, the sequence in which items meeting the selected specifications are presented to the consumer is always the same.

As the number of items in the system and their diversity increase, it is possible to discourage users who have particular interests, by making them view the fixed sequence of items, many of which have little appeal to them, before items are presented which may be of interest. It would be desirable therefore to be able to identify the type of person using the system in order to present first items which will most likely appeal to that type of person. However, it has been found that if persons are asked directly for information about themselves which would be helpful in determining what type of products would appeal to them, such as age, income bracket et cetera, the results are often not very reliable.

It has been determined that certain types of persons tend to shop at certain times. However, the trends are not so well defined that a rigid system can be reliably based upon them.

It is therefore, the primary object of the present invention to provide apparatus and a method for displaying items to the users of video merchandising systems which adapts to the pattern in which different types of persons shop.

It is also an important object of the invention to provide such an apparatus and method which induce such shopping patterns from the responses of users without directly asking them for the desired information.

SUMMARY OF INVENTION

These and other objects are realized by the invention which utilizes an interactive computer inductive learning program in conjunction with video merchandising equipment to present merchandise items to users in a sequence sensitive to their interests based upon frequently updated patterns developed through data received from previous users. A second level of inductive learning further tailors the presentation to the tastes of the current user.

Both levels of inductive learning assign values for one or more attributes to each of the items to be displayed. The sequence in which the items are presented is rearranged in accordance with the attribute values of the items previously selected, so that the order of presentation continuously evolves based upon experience. More particularly, in the case of the first level of inductive learning, when a user expresses an interest in an item by generating a user input, the recurring time period and the assigned values of the attribute or attributes of the selected item are recorded. This information is used to determine the most frequent value of each of the attributes for each of the recurring time periods. As to the current time period, the match between the assigned values of the attributes for each item and the most frequent values of those attributes during that time period is determined. A list of the items, which determines the order in which they are presented, is then resorted in descending order of the matches between the assigned attribute values and the most frequent attribute values for the current recurring time period. The recurring time periods may be defined by intervals measured by a clock or by intervals during which certain conditions exist, such as periods when the temperature is in certain ranges or when it is raining or sunny, et cetera.

The most frequent value of each attribute is determined by generating a rule, preferably in the form of a decision tree, from the recurring time periods in which data were recorded, and the assigned values of the attributes. The decision tree groups together recurring time periods in which the most frequent values of the attributes are the same. Thus, while data may be recorded on an hourly basis for instance, several hours such as the entire morning or all weekend, may be grouped together when the most frequent values of the attributes of the selected items during these extended time periods indicate that the same type of shopper is most likely to use the system throughout that period.

Where there are a plurality of attributes, each item is assigned an ordered number of attribute values. In determining the most frequent value of an attribute during a recurring time period, the highest ordered value of the attribute is used. In determining the match between the attribute values assigned to each item and the most frequent value of each attribute during a recurring time period, the order in which the most frequent value is assigned to that item is taken into account.

The second level of inductive learning utilizes a second set of attributes, one or more of which are assigned to at least some of the items, to custom tailor the sequence in which the items are displayed to the current user. While the first set of attributes used by the first level of inductive learning includes attributes which define categories of users such as for instance, age, gender and income level, the second set of attributes is directed to preferences of the individual user, for item characteristics such as for instance whether the user prefers trendy items, or electronic gadgets, or easy to clean items. As the user selects items, the second level of inductive learning determines which of the attributes from the second set that user prefers, and items possessing these attributes are moved to the top of the list which determines the order of presentation. This preference could change as the individual user continues to select items so that the order of presentation may change also.

The first level of inductive learning is applied between users and the list generated by it is retained throughout the period of use by a current user. The current user's preferences, as determined by the second set of attributes, only modify the sequence temporarily. When the current user is finished, values of the first set of attributes of the selected items are used by the first level of inductive learning to resort the list, if necessary, and the values of the second set of attributes of the selected items are cleared.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
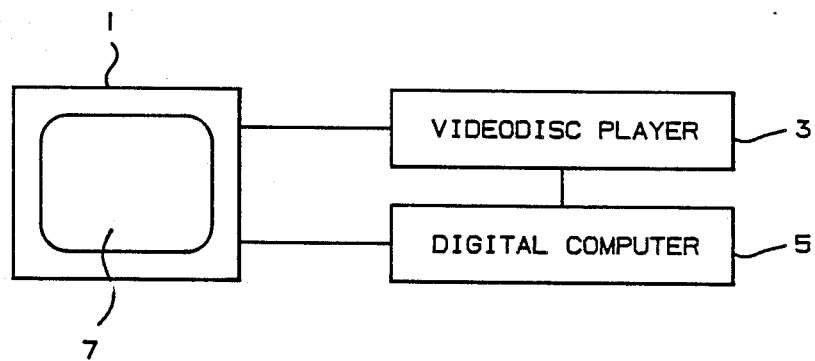
FIG. 1 is a schematic diagram of a video merchandising system incorporating the invention.

FIG. 1 illustrates apparatus for carrying out the invention which includes a video monitor 1, a videodisk player 3, and a programmed digital computer 5. A suitable commercially available system is the Sony VIEW SYSTEM TM which includes their LDP 2000 laser videodisk player and SMC 2000 processor. A suitable user interface device 7 such as a touch screen attachment for the video monitor 1 provides means for the user to generate inputs to the system.

Recorded images of the items to be presented by the system, the video demonstrations of at least some of those items, may be randomly accessed by the videodisk player for display on the monitor. Sequencing of the presentations is controlled by the programmed digital computer 5 which is interactive with the user through the video monitor touch screen 7.

The system operates on the market principle that during certain hours of certain days a specific type of consumer will be shopping and that a video catalog presentation of the merchandise of interest can be customized to this type of customer. Through the use of an inductive learning program in conjunction with user input to an interactive computer, the frequency of inspection of a product is recorded when the consumer specifically requests more information about an item via an input device such as the touch screen 7. This data is then processed in an attempt to recognize viewer interest and to refine viewing patterns to present catalog items in a sequence most appealing to an individual viewer. Data from users is categorized and processed by time, day and month increments such that the video presentation will be customized to any time increment determined by user input. For example, although hourly increments may be used to categorize the inputs, through the inductive learning executions, clusters of similar hourly patterns may emerge such that three individual hours with similar presentations will seem to "merge" to form a three hour cluster. Any time increment is possible, but the exemplary system will be sensitive to hourly, daily, and seasonal increments.

The exemplary embodiment of the invention uses two separate inductive learning algorithms. The first algorithm which is used for a first level of inductive learning by the system, incorporates an algorithm called ID3 described in an article by J. R. Quinlan entitled "Induction of Decision Trees" which appears in Machine Learning 1:81-106, Kluver Academic Publishers, Boston 1986. The second algorithm used at the second level of inductive learning is a less sophisticated program described below. Each of these algorithms requires a set of attribute values for each item of merchandise to be displayed. In the exemplary embodiment, the ID3 algorithm is used to evaluate a product gender value, a consumer income range for the product, and the age range of a consumer interested in the product. These values are the result of extensive market studies for each item of merchandise. The second less sophisticated algorithm evaluates attributes that identify the consumer's interest; such as whether the item is electronic, easy to clean, trendy, etc. It is to be understood that other or additional attributes may be utilized for the two levels of inductive learning.

The first level of inductive learning is used to make a determination as to the type of shopper who is most likely to be using the system at the present time based upon the customer attributes of the items selected by previous users during corresponding time periods. The items are then arranged by how closely their consumer attribute profiles match the assumed shopper.

In an effort to guess who the current customer is, the ID3 algorithm, as described by J. R. Quinlan, is applied to the customer attributes. Items are then arranged by how closely their consumer attribute profiles match the assumed shopper.

For the inductive learning process, several data files are used. There is a file which stores consumer profile data for each item and a separate file used to store items viewed by users. These two files are then used to create data files actually accessed by the inductive learning process.

A very short example will clarify the steps involved. For the purpose of demonstration, all time parameters have been simplified. Time of day has been classified as working (w) and non-working (nw) hours, days of the week are weekdays (wd) or weekend (we) days, and months are summer (s) or non-summer (ns). These categorizations are arbitrary and have been selected for the purpose of demonstration so that an "interesting" rule can be derived using a minimum of data records.

When a customer indicates an interest in an item, the system stores in a file the time of day and the product which was viewed. After several user interactions, the data file could look like this:

TABLE 1

| | User Response Data File | | |
|---|---|---|---|
| Day of Week | Month | Hour | Item |
| we | s | w | Osterizer Blender |
| we | s | nw | Coffee Grinder |
| we | ns | w | Kitchen Center Appliance |
| wd | ns | nw | Electric Wok |
| wd | s | w | Self-Sharpening Scissors |
| wd | ns | nw | Toaster |
| we | ns | nw | Hand Mixer |

Each item in the database has a consumer attribute profile assigned through market research. The profile describes the type of person most often interested in this type of product by describing in the exemplary system such a person's age, gender, and income range. Like the time information, these attributes have been arbitrarily clustered for ease of demonstration as follows:

TABLE 2

| | Consumer Attribute Categories | |
|---|---|---|
| Attribute | Value Range | Value Assigned |
| Age | <25 | 0 |
| | 25-40 | 1 |
| | >40 | 2 |
| Gender | More Male Consumers | 0 |
| | Both Female and Male consumers | 1 |
| | More Female Consumers | 2 |
| Income | <$20K | 0 |
| | $20K-$40K | 1 |
| | >$40K | 2 |

The item consumer profile for several products look like this:

TABLE 3

| Item Consumer Attribute Profiles | | | |
|---|---|---|---|
| Item | Age | Gender | Income |
| Osterizer Blender | (1 2 0) | (0 2 1) | (1 0 2) |
| Hand Mixer | (1 2 0) | (2 1 0) | (1 0 2) |
| Coffee Grinder | (1 2 0) | (1 2 0) | (1 0 2) |
| Steam Iron | (2 1 0) | (2 1 0) | (0 1 2) |
| Self Sharpening Scissors | (2 0 1) | (1 2 0) | (0 1 2) |
| Kitchen Center Appliance | (2 1 0) | (2 1 0) | (0 2 1) |
| Electric Wok | (1 0 2) | (1 0 2) | (1 2 0) |
| Toaster | (1 0 2) | (1 2 0) | (0 1 2) |
| Le Chef Food Processor | (1 2 0) | (1 2 0) | (1 0 2) |
| Vista Food Processor | (1 2 0) | (2 1 0) | (2 1 0) |

The parentheses enclose an ordered list of the attributes of the consumers who most frequently purchase the product. For example, the Osterizer Blender most often is purchased by a consumer in the 25-40 year old range (designated by the 1 in the first place of the first set of parentheses), followed by the people over 40, and least by folks under 25. This complete ordered listing is needed for scoring items against the assumed consumer as will be described later.

Using the item consumer attribute profiles of Table 2 and user response data of Table 1, three data files are built for the inductive learning process. For each record in the user response data file, an entry is created for each of the age data file, gender data file, and income data file by recording the time information and the first value in the item's consumer profile attribute value list. For example, the first user response record (we s w Osterizer Blender) would create the following three entries:

| | Age Data File (AGE.DAT) | | |
|---|---|---|---|
| we | s | w | 1 |
| | Gender Data File (GEN.DAT) | | |
| we | s | w | 0 |
| | Income Data File (INCOME.DAT) | | |
| we | s | w | 1 |

The final data files for the example are as follows:

TABLE 4

| Example Data File |
|---|
| AGE.DAT |
| we s w 1 |
| we s nw 1 |
| we ns w 2 |
| we ns nw 1 |
| wd s w 2 |
| wd ns nw 1 |
| we ns nw 1 |
| GEN.DAT |
| we s w 0 |
| we s nw 1 |
| we ns w 2 |
| wd ns nw 1 |
| wd s w 1 |
| wd ns nw 1 |
| we ns nw 2 |
| INCOME.DAT |
| we s w 1 |
| we s nw 1 |
| we ns w 0 |
| wd ns nw 1 |
| wd s w 0 |
| wd ns nw 0 |
| we ns nw 1 |

From these data files, the first level of the inductive process uses the ID3 algorithm, to derive a rule, in the form of a decision tree, that can be used to decide who is currently using the machine. According to the ID3 algorithm, the value of the information which would be gained by using a specific attribute as a branching node in the decision tree can be determined by the following formula:

$$\text{Gain}(A) = I(\text{overall}) - E(A)$$

(The gain that can be expected by using an attribute A as a branching node is equal to the Information content of the attribute less the expected information requirement). where:

$$I(\text{overall}) = -\frac{p}{p + \ldots + n} \log_2 \frac{p}{p + \ldots + n} - \ldots$$

-continued $$-\frac{n}{p+\ldots+n} \log_2 \frac{n}{p+\ldots+n}$$

$$E(A) = \sum_{i=1}^{V} \frac{p_i+\ldots+n_i}{p+\ldots+n} I(p_i,\ldots n_i)$$

where
A is any attribute,
P is the number of occurrences of value P for attribute A.
n is the number of occurrences of value N for attribute A. and
v is the total number of occurrences of attribute A.

Looking only at the gender data file, the formula would be applied as follows:

First we isolate the "classes" of the data file—or the results of the data records. In our case, the results are the consumer attribute values;

occurrences of 0 = 1 occurrences of 1 = 4 occurrences of 2 = 2

Calculating the information content gives the following:

$$I(GEN) = -\frac{1}{7} \log_2 \frac{1}{7} - \frac{4}{7} \log_2 \frac{4}{7} - \frac{2}{7} \log_2 \frac{2}{7} = 1.378 \text{ bits}$$

Now, isolating only the day-of-week attribute for the gender file, we get the following data table:

TABLE 5

| Day-of-Week Attribute Summary for Gender File | |
|---|---|
| Day-of-Week Value | Summary of Data |
| we | # records = 4 |
|  | # 0 values = 1 |
|  | # 1 values = 1 |
|  | # 2 values = 2 |
| wd | # records = 3 |
|  | # 0 values = 0 |
|  | # 1 values = 3 |
|  | # 2 values = 0 |

Using this data, the equation for we is:

$$I = -\frac{1}{4} \log_2 \frac{1}{4} - \frac{1}{4} \log_2 \frac{1}{4} - \frac{2}{4} \log_2 \frac{2}{4} = 1.50$$

the equation for wd is:

$$I = -\frac{0}{3} \log_2 \frac{0}{3} - \frac{3}{3} \log_2 \frac{3}{3} - \frac{0}{3} \log_2 \frac{0}{3} = 0$$

and the equation for the expected information requirement is:

$$E(\text{day-of-week}) = \frac{4}{7} I(we) + \frac{3}{7} I(wd) = .857 \text{ bits}$$

Therefore, to calculate the gain, we simply subtract the above E from the value of the overall information content calculated previously;

Gain(day-of-week) = 1.378 − .857 = .521 bits
Similarly, the inductive learner derives:
Gain(month) = .414
Gain(hour) = .236

The ID3 algorithm chooses the day-of-week attribute as the root node for the decision making tree because it has the maximum information value. The data is then divided based upon the value of the day-of-week attribute value:

TABLE 6

| Day-of-Week Decision Tree Root Node and Resulting Data Sets | | | | | |
|---|---|---|---|---|---|
| Day of Week | | | | | |
| wd | | | we | | |
| ns | nw | 1 | s | w | 0 |
| s | w | 1 | s | nw | 1 |
| ns | nw | 1 | ns | w | 2 |
|  |  |  | ns | nw | 2 |

Notice the day of the week attribute has been removed from the data file.

Figure 2:
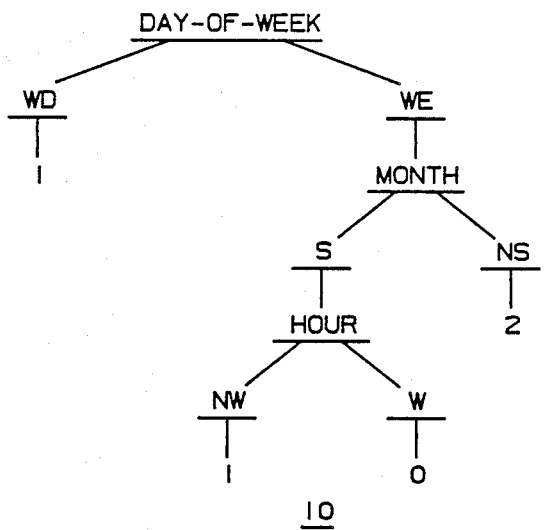
FIGS. 2, 3, and 4 are decision trees illustrating the manner in which rules are generated in accordance with the teachings of the invention.

The same process described above is repeated for the month and hour attributes for each of the new data record sets. After the process is complete, the rule 10 illustrated in FIG. 2 results.

Figure 3:
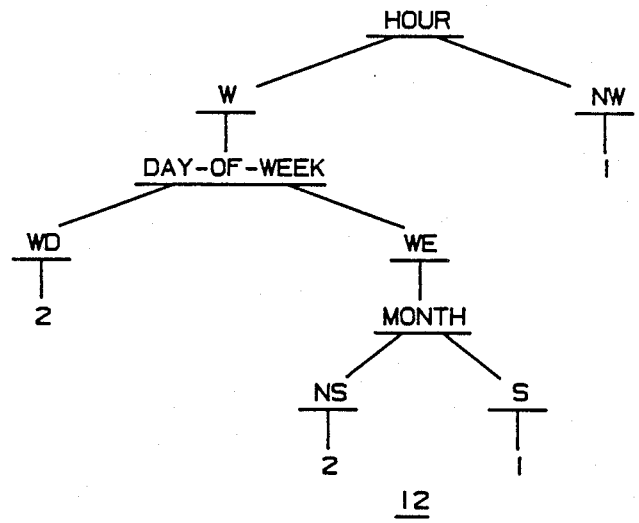
Figure 4:
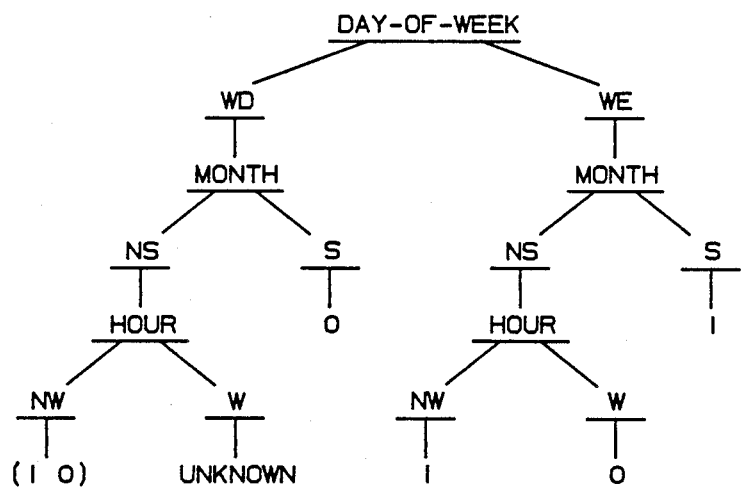

Similarly, rules 12 and 14 induced for the age and income data are shown in FIGS. 3 and 4.

Notice on the income decision tree 14 shown in FIG. 4 that the final leaves of the decision trees may be ordered lists of values, rather than a single value. This occurs if "rule conflicts" arise from the data. In an ordered list, the first value is the one most often seen, the second is the next most frequent value, etc.

Once the rules have been established, they are used by the system to guess who is most likely using the system, and what kind of products that person will like best. To accomplish "best guessing", the system checks internal clocks to determine the time parameters, then executes the rules. The items in the database are then arranged according to how closely they match the rule results. For example, if a shopper enters the store at 10:00 AM on July 21, 1986, the system executes the rules for a summer weekday during working hours and determines that someone with the following attribute profile is most likely to be currently using the system:

TABLE 7

| Sample Consumer Profile for Summer Weekdays during Normal Working Hours |
|---|
| Age - 2 |
| Gender - 1 |
| Income - 0 |

(In other words, all the retired folks on Social Security are shopping now.) To re-order an item in the database, the product's consumer profile is checked against the above determined consumer profile and the items are scored by how closely the profiles match. Items with the best scores (minimum in this case) are shown first. To score the items, a simple place-checking algorithm is used. If the consumer's first profile values exactly match the item's most common consumer profile, a score of 0 results. However, if the profiles differ, 1 point is collected for each place the attributes do not match. For example, the hand mixer has the following consumer profile taken from Table 3:

|  | Age | Gen | Income |
|---|---|---|---|
| Hand Mixer | (1 2 0) | (2 1 0) | (1 0 2) |

Checking this profile against the determined current consumer profile, we see the assumed consumer's age is one place away from the first spot, so age gets a score 1. Similarly, gender and income are both one place off and so they both get scores of 1 giving the hand mixer the composite score of 3. Similarly, all other items in the data base are scored, then the items are sorted by score in ascending order.

Utilizing this sample consumer profile and place checking algorithm, an ordered list of the sample items is generated which looks like this:

TABLE 8

Ordered List as Determined by First Level of Inductive Learning.

|  | Score |
|---|---|
| Self Sharpening Scissors | 0 |
| Kitchen Center Appliance | 1 |
| Steam Iron | 1 |
| Coffee Grinder | 2 |
| Toaster | 2 |
| Le Chef Food Processor | 2 |
| Hand Mixer | 3 |
| Self Sharpening Knives | 3 |
| Osterizer Blender | 4 |
| Electric Wok | 4 |
| Gourmet Cutlery Set | 4 |
| Vista Food Processor | 4 |

This list arranges the items in the order in which they are most likely to appeal to the assumed user of the system during the current time period selected for the example. As data accumulates, the profile of the assumed user could change based upon the selections made by previous users so that the list may be reordered based upon experience. The list will be automatically reordered to reflect both short term and long term trends in the times that different types of shoppers use the system.

The reordered list of items is used to determine the order in which items are presented to a user. The effects of reordering of the list are best seen in a browse mode of the system to be discussed below in which all of the items are displayed sequentially in the order of the list. The order, however, also influences all other item retrievals which are also discussed below. If for example, the system is directed to access drink makers, the order in which those products are shown will be consistent with their placement in the ordered list.

The reordering of the database is only carried out between users. Once a user initiates a session, the order of items in the data base remains fixed until the session is terminated. Termination of use by a given user is indicated by an input by the user so indicating, or by the elapse of a given interval following a request for an input by the system. If another user should begin using the system within the given interval so that the inputs appear to originate from the same user, there is no significant affect on the first level of inductive learning since it is the time the inputs were generated which is considered by the system and not whether they were generated by one or more users. It will, however, result in a delay in reordering of the data base by the first level of inductive learning, and will have a very definite affect on the second level of inductive learning.

The second level of inductive learning attempts to identify item characteristics which are interesting to a specific consumer. As with the first level of induction, data is collected for the personal inductive process when an item demonstration is requested. Instead of information about the item's consumer attributes, a second set of attributes which represents the user's preference in the functional characteristics of the item are tracked. If the consumer is interested in items with the same characteristics, the second level of induction will converge on that pattern and arrange the sequence of items to be shown accordingly. Data is kept only for the user session, so each user creates his or her own set of important or preferred characteristics.

In the item database, each item is related to a set of characteristics. A listing of this data using the items from the example above in order as determined by the first level of inductive learning, looks like this:

TABLE 9

| Item Functional Characteristics | |
|---|---|
| Item | Characteristics |
| Osterizer Blender | electronic |
| Hand Mixer | traditional "easy to clean" simple |
| Coffee Grinder | trendy compact |
| Steam Iron | electronic traditional |
| Self Sharpening Scissors | traditional simple |
| Gourmet Cutlery | traditional bulky simple |
| Self Sharpening Knives | trendy |
| Kitchen Center Appliance | bulky electronic complex |
| Electric Wok | trendy "easy to clean" |
| Toaster | traditional simple |
| Le Chef Food Processor | trendy compact simple |
| Vista Food Processor | trendy bulky complex |

When a demonstration of one of these items is requested, a number of things happen. First, a list of previously viewed items is checked to make sure this item has not already been processed, as items are only processed once for each consumer. If the item is a new one, the name is added to the "previously seen" list, the item's consumer attributed information is stored for the first level of induction, and then the item's characteristics are processed. For each characteristic of an item, an entry is kept in the database stating the characteristic and the number of times that characteristic has occurred this user session. For example, if the consumer views the Hand Mixer, the following entries would result:

TABLE 10

"Important Characteristics" Table Following Demonstration of the Hand Mixer

| Characteristics | # Occurrences |
|---|---|
| traditional | 1 |
| easy to clean | 1 |
| simple | 1 |

When only one item has been demonstrated, no reordering of future presentations is done, because a characteristic is not considered significant unless it appears more than once. Thus, the above entry would cause no change in order. If, however, the consumer then looks at the toaster, the entries in the characteristic table look like this:

TABLE 11

"Important Characteristics" Table
Following Demonstration of Toaster

| Characteristic | # Occurrences |
|---|---|
| traditional | 2 |
| easy to clean | 1 |
| simple | 2 |

Now a significant trend is developing.

An example will show how the trend affects the later presentation of items. Assume the entries in Table 11 were logged by the computer in response to the consumer's selections. Also assume the ordered list of items in Table 8 make up the complete ordered item database. If the consumer requests to see items which chop, cut or grind vegetables, the following list of items is collected from the ordered database in Table 8 and sent to a "user-presentation" routine:

List 1

Items Which Chop/Cut/Grind Vegetables
("LeChef Food Processor" "Self Sharpening Knives"
"Osterizer Blender" "Gourmet Cutlery Set"
"Vista Food Processor")

To order these items, the user presentation routine first creates the list of "important characteristics" established by looking for those characteristics which appear most frequently in Table 11. In this example, the list is:

List 2

"Important Characteristics"
(traditional simple)

The item List 1 is then split into three sublists based on how many characteristics the items have in common with the list of "important" characteristics. First a sublist of items which have ALL the "important" characteristics is collected from List 1. In this case, only the Gourmet Cutlery Set is both traditional and simple. The remaining four items are then checked to see if they have ANY characteristics in common with the "important" ones. This list of partial matches contains only the Le Chef Food Processor, with "simple" as a characteristic. The remaining items are retained in their original order relative to each other based on their order of appearance in Table 8. The three sublists are then appended to give the final reordered list:

List 3
Ordered List Based on Second Induction

| | |
|---|---|
| All Match | ("Gourmet Cutlery Set") |
| + Partial Match | ("Le Chef Food Processor") |
| + No Match | ("Self Sharpening Knives") |
| | ("Osterizer Blender") |
| | ("Vista Food Processor") |
| Final Ordered List | ("Gourmet Cutlery Set") |
| | "Le Chef Food Processor" |
| | "Self Sharpening Knives" |
| | "Osterizer Blender" |
| | "Vista Food Processor") |

The items are then presented to the user in this new order. The second level of inductive learning serves to highlight specific "best guess" items by bringing them quickly to the user's view. The overall "flavor" of the item list is however maintained.

As the user session progresses and other items are viewed, the Table 11 entries will change and a new characteristic could emerge as most important. The program is immediately sensitive to such changes, as the entire process is repeated each time a group of items is passed to the user presentation routine. The process is also rerun each time an item is demonstrated so that the remaining items will be ordered in as current an order possible. Between users, all characteristics data stored for the previous user session is removed and a new table is established for the next consumer.

The merchandiser system in which the invention is used has been designed in layers. At the core of the system is a database of product attributes, with videodisc information, pricing, and other product specific information. Above the database is a relational network which allows the functional logic to choose and order items based on desirable attribute values. Finally the user help feature extracts information from the viewer, passes on the needed data to the rest of the system, and prepares the responses for the user.

Figure 5A:
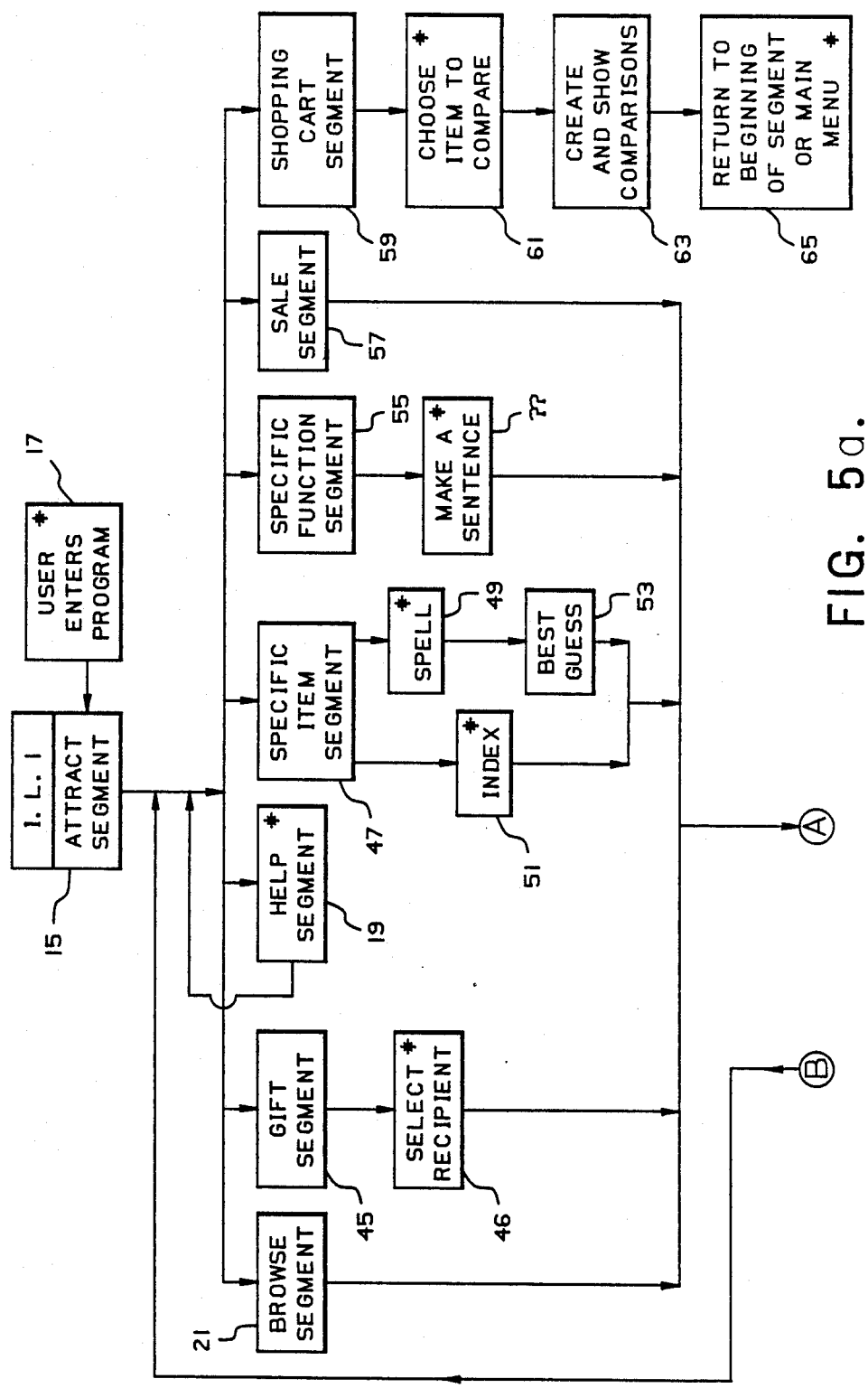
FIGS. 5a and 5b when placed end to end with the connections indicated by the encircled letters A and B, illustrate a flow chart of the software for the merchandiser system incorporating the invention.

This merchandiser system has several modes of operation which are best understood by reference to the flowchart of the system software illustrated in FIGS. 5a and b. Steps in the program which require user input are identified in the flowcharts by an asterisk. As indicated in block 15 of FIG. 5a, when the system is idle, an "attract segment", designed to catch the eye of passersby, is executed. The attract segment consists of a continuous loop presenting current top-selling items, sales items, and in-store specials on the video monitor. The in-store specials portion of the attract segment is a written page describing items on special which are not necessarily on the system. This allows the system to remain current, without changing the videodisc for every new product. It is during the attract segment that the first level of inductive learning, the IL 1 program, is executed to generate a rule for the current desirable attribute values.

When a user becomes sufficiently interested in the system to touch the screen, as represented by the block 17, he or she is taken through a brief help segment designed to familiarize new users with the icons that are used throughout the session. Then the user is presented with a main shopping menu which offers the following options:

(1) Help with using the system.
(2) Browsing through the catalog.
(3) Selecting a gift.
(4) Finding a specific item.
(5) Finding an item which performs a specific function.
(6) Seeing what is on sale.

And one of the following:

(7)
A. Attract segment item.
B. "Touch the bar indicating what you would like to do".
C. Viewing the shopping cart items.

The user selects a segment of the program by touching the appropriate statement in the menu. The help segment 19 of the program provides information to the user on the other portions of the system. A general overview of the system and how to use the help feature is initially presented, along with a listing of the other system functions. The user then can chose which segments of the program to call up.

Figure 6:
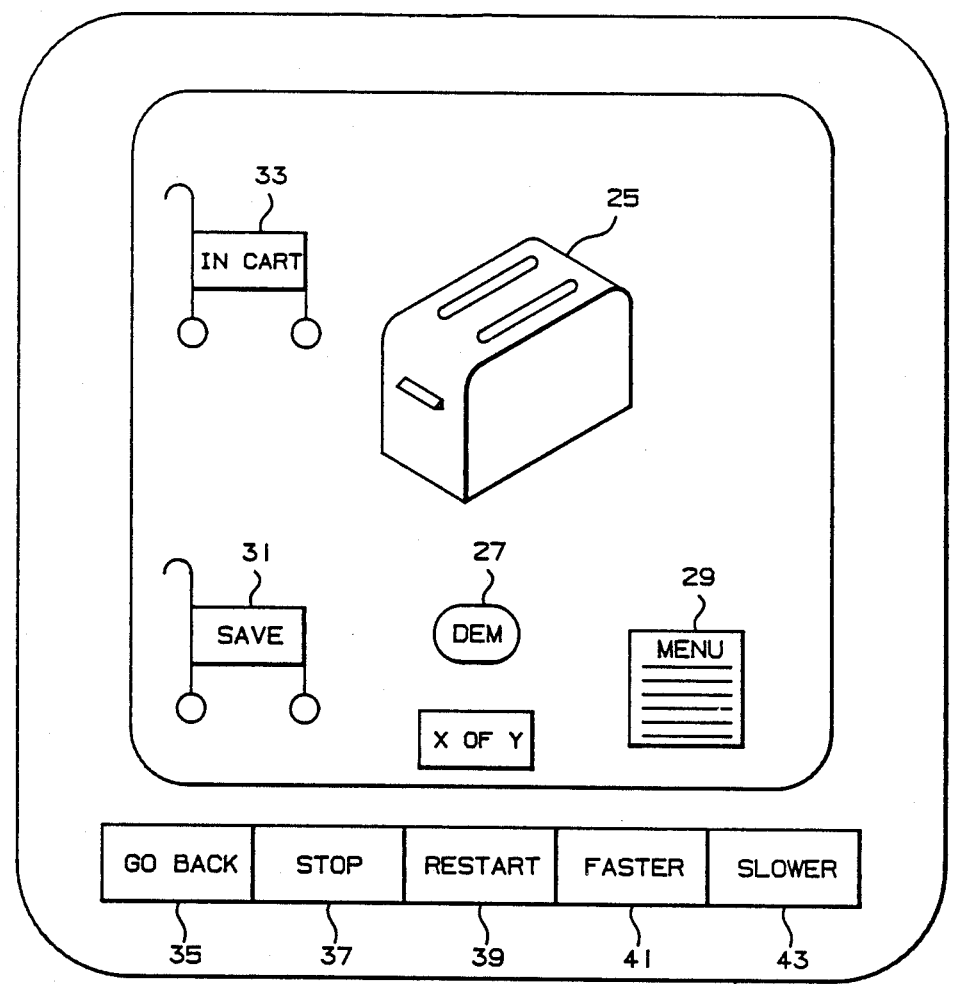
FIG. 6 is an illustration of a video display generated by the merchandiser system incorporating the invention.

The browse segment 21 presents an overview of all the products on the system by sequentially presenting on the video monitor 1, at a user adjustable rate, all of the items in the system. The items are sorted prior to showing them to the user so the items believed to be of most interest are shown first. FIG. 6 illustrates a typical display 23 for the browse segment. In addition to a color picture 25 stored on the videodisc of the item, the display includes icons which enable the user to control the flow of the program. For instance if the user would like to see a demonstration of the item he touches the "dem" icon 27. If he would like to return to the main menu he presses the "menu" icon 29. If the user would like to save the item in his "shopping cart" he presses the "save" icon 31 which generates the "in cart" icon 33 indicating that the item has been saved.

The user can further control the presentation by touching the "go back" icon 35 to return to an item that has been previously shown, the "stop" icon 37 to freeze the currently displayed item for 20 seconds, or the "restart" icon 39 to resume the sequencing. The items are displayed for a nominal interval, for instance 5 seconds, however, the user can speed up the sequence by pressing the "faster" icon 41, or slow the sequence down by pressing the "slower" icon 43. The preferred rate established by the user is stored and used as the default rate for subsequent presentations to the current user.

The gift segment 45 assists the user in selecting a gift. It is based on a marketing theory which asserts that people should be categorized by their life styles and values when choosing suitable gifts, rather than more typical things like income or age. Thus the gift suggestion segment 45 begins by showing 6 images of people and asks the user to choose which picture best describes the gift recipient. When a selection is made, a number of gift ideas, such as four, are presented which have been determined most appreciated by the group chosen. If the user is not pleased with these suggestions, the system will ask more typical questions, such as for instance, the hobbies and age of the recipient, and a desired price range of the gift, and then additional suggestions will be made based upon these selections.

The specific items segment 47 provides the user with 2 means for calling up information on a specific item. The user can describe the product by typing in a product name or description which utilizes a "spell" subroutine 49, or he can choose to see an index 51. If the user types in a product name or description, a parsing routine is used to make a "best guess" 53 of what the user has requested. If the user requests a generic item, for instance blenders, all items meeting that description, and items having similar functions, will be selected for presentation.

The specific function segment 55 permits the user to request to be shown items which perform a particular function or combination of functions. This segment is also known as "build-a-sentence", because when the user choses this option, lists of verbs and nouns are presented. When the user touches a verb describing what should be accomplished, the valid nouns for the chosen verb are highlighted. The user completes a sentence by touching the appropriate noun and all items fitting the description are used. The relational network is used to make creative as well as predictable suggestions.

The sale segment of the program 57 alows the viewer to browse an electronic sales flyer. Any items on the system which have been marked "on sale" by store personnel are presented, in an order determined by the inductive learner. When all the items on the videodisc have been shown, the user has an option of seeing "other in-store specials". These are short, catchy write ups which describe other products in the store which should be noticed, but which are not yet on the system.

The last option presented to the view on the main menu is dependent on the user's path through the system, and whether any items have been "saved" until now. When the user is first shown the main menu, after touching the screen during the attract segment, the final option given the user is to see the item that was on the screen during the attract segment when the user touched the screen. For example, if the user saw the Gourmet Cutlery Set and decided to initiate a user session by touching the screen, the final option would be:

"or touch here to see the Gourmet Cutlery Set."
This option is offered so that the user does not have to relocate the item which interested him in initiating a session. The user only has one chance to respond to this option, however as one of the following options is presented in subsequent presentations of the main menu.

If the user is not seeing the menu for the first time, the final option may in fact be just a statement directing user to "touch the bar indicating what you would like to do". This statement is merely supposed to act as an instruction, reminding the person to touch the screen to provide input.

The last possibility for the final option on the main menu is to "see the items in your shopping cart." When the user chooses to view the items in the shopping cart, the shopping cart segment 59 of the program is entered. In this segment, a screen displaying all the items which have been saved is displayed. The user can then see a demonstration of the item, or choose items to be included in a comparison as indicated in block 61. All the items specified will be compared and described 63. The first comparison prepared is a pricing comparison. In addition to the usual pricing information, the pricing comparison tells if there are multiple models of an item, and whether an item is on sale. Following the price information, the functional comparison of the items is prepared. For this comparison, items with similar functions are grouped together and a summary of the results is printed to the screen. Finally, the user can see a detailed description/comparison of the items. Again like items are grouped, but this time, the features are highlighted, first as to how the products are similar and then as to how they differ. If the items chosen from the shopping cart are not comparable, individual descriptions are supplied. All comparisons are created during the user's session, not preprogrammed, so that any changes in product features or pricing information would be included in reports without any programming changes required.

As mentioned previously, the merchandiser system has been designed in layers. The only later which the user sees is the top most user help feature or the "communicator". The communicator performs many tasks, all designed to make the system more user-sensitive, responsive, effective, and generally more "intelligent".

The most visible task which the communicator performs is the selection and offering of help to the user. If the user takes longer than the system feels is "normal"

to respond to a menu or choice, the communicator will select a helpful message based upon the user's place in the system and the path taken to reach that place, and print out the message in a "FYI", (For Your Information) window. The system will make three such suggestions, telling what the various options will do, or even suggesting an appropriate response. If no response is noted after the third message, the system assumes the user has left and "times-out", re-executing the first level of inductive learning, IL 1, and beginning the attract segment 15.

In addition to offering helpful suggestions to the user, the communicator performs background functions which influence the user, but which are not obvious. These functions are performed by the portion of the software described by the flowchart of FIG. 5b. After the user branches to any of the five main user options (browse, gift, specific time, specific function, or sale items) the communicator accesses the relational network to choose appropriate items, block 67, and then rearranges those based upon the second level of inductive learning, IL 2, to make a "best guess" as to what will be most interesting to this consumer 69. Rearrangement of the items at this point in the program is only carried out if the current user has made at least two selections. For instance, if the user has just entered the system and has requested the browse segment, there is no information available yet to determine this user's preferences, and hence this rearranging subroutine is bypassed.

Appropriate items for the mode selected by the user are displayed one at a time as indicated in block 71 in the sequence determined by the first level of inductive learning, and the second level of inductive learning, if appropriate. A request by the user, block 73, for a demonstration of the item currently being displayed on the video monitor is used as an indication of the user's particular interest in a specific item. Thus, in response to a request for a demonstration, the second level of inductive learning IL2 program is run, block 75, while a video recording stored on the videodisc of a demonstration of the product is presented on the video monitor, as indicated in block 77. The Il 2 program, which is discussed more fully in connection with FIG. 8, among other things records the fact that the demonstration has been requested on the item, together with the date, time, and month of the entry. Upon completion of the IL 2 program, the remaining items selected for the specified system mode are rearranged in block 81 based on this updating of the second level of inductive learning, if appropriate.

Whether or not a demonstration has been requested the shopper has the option of saving the item in his or her electronic shopping cart, block 83. Items saved by touching the save icon 31 are stored, block 85, for further consideration.

At any time, the user has the option, block 87, of pressing the menu icon 29 is he or she has seen enough items in the current mode and desires to return to the main menu. In the absence of an indication that the user wants to return to the main menu, the program loops back, block 89, to present the next item in the selected list of items.

When all of the selected items have been presented, a submenu is generated, block 91, presenting the options available to the user. The options available depend upon the users past activity. For example, a user completing the gift section will be offered among other things, the option to review the gift suggestions presented, or see different gift suggestions. If the user has saved items in the shopping cart, the option will be given to review these items also. To enhance the versatility of this menu, the program is written to interpret the sentence which describes the option chosen by the user. This is done using a parsing routine, which in the exemplary embodiment is more of a key work matching routine, which analyzes the character strings and causes the program to branch to the appropriate routine. This allows the options to be reordered, reworded, or new options to be added without changing any code.

Figure 7:
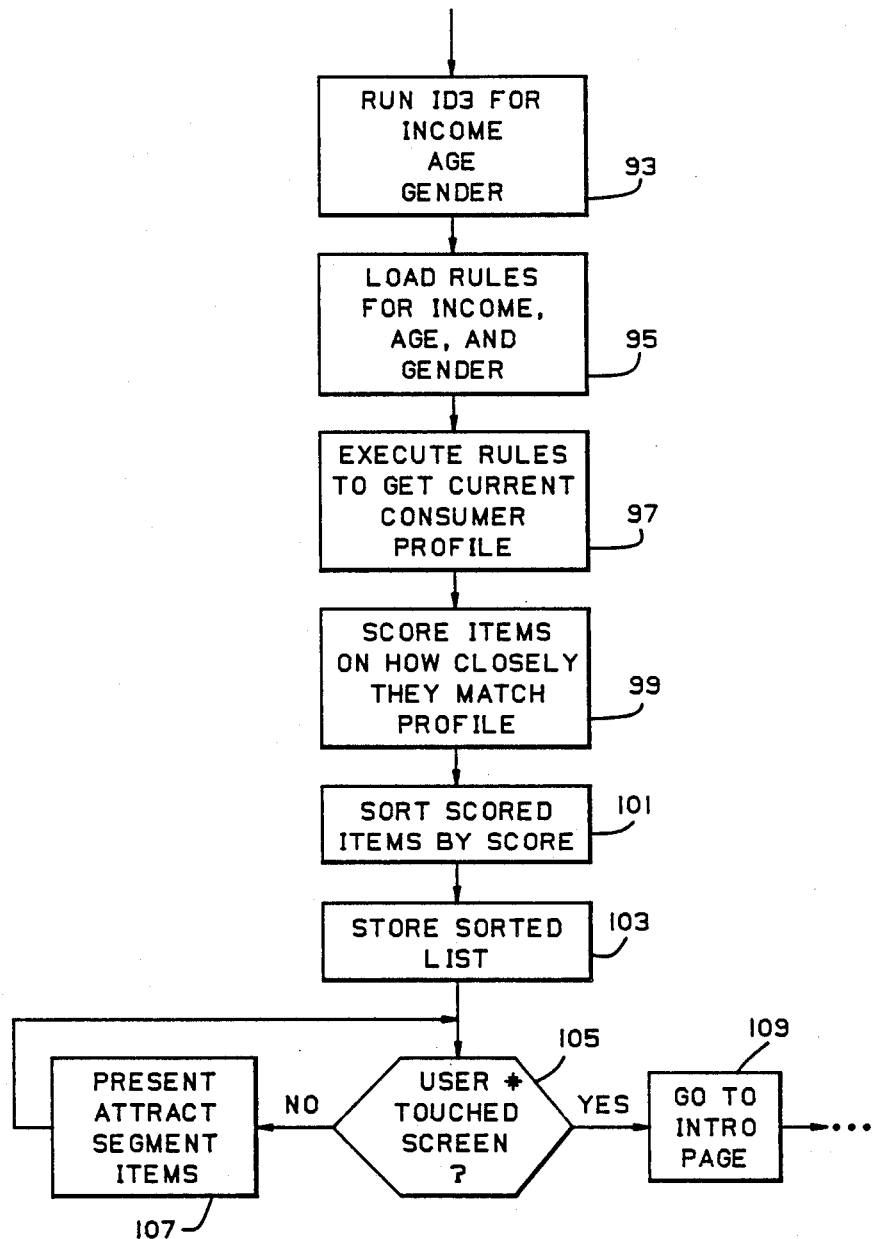
FIG. 7 is a flowchart of the software for executing the first level of inductive learning in accordance with the invention.

FIG. 7 illustrates the flowchart for the first level of inductive learning, IL 1. When the system times out, indicating that the last user has terminated use of the system, the ID 3 routine for the selected attributes, income, age, and gender in the exemplary embodiment, is run, block 93. A detailed flowchart for the ID 3 routine is illustrated in commonly owned U.S. patent application Ser. No. 826,524, filed on Feb. 6, 1986 in the names of William J. Leech and Thomas N. Dean and entitled "An Automated Rule Based Process Control Method with Feedback and Apparatus Therefore". For convenience, this flowchart is repeated and discussed in the appendix of this application. Software implementing the ID 3 algorithm is commercially available from the assignees of this invention, Westinghouse Electric Corporation, under the trademark MasterMinder. Herman Edge of Palo Alto, Calif. also markets software implementing the ID3 algorithm under the designation Expert Ease.

The rules derived by the ID3 routine for income, age and gender are loaded in block 95. Each of the rules is executed in block 97 to determine a current consumer profile by applying the rule to the data stored in Table 1 in the manner described previously. Each of the items is then scored in block 99 on how closely they match the profile the items are then sorted based on the score in block 101 and the sorted list is stored in block 103. If a new user has not touched the screen, block 105, the attact segment items are presented in block 107. When a new user does enter the system, the introductory page is presented, block 109, to instruct the user on how to use the system.

Figure 5B:
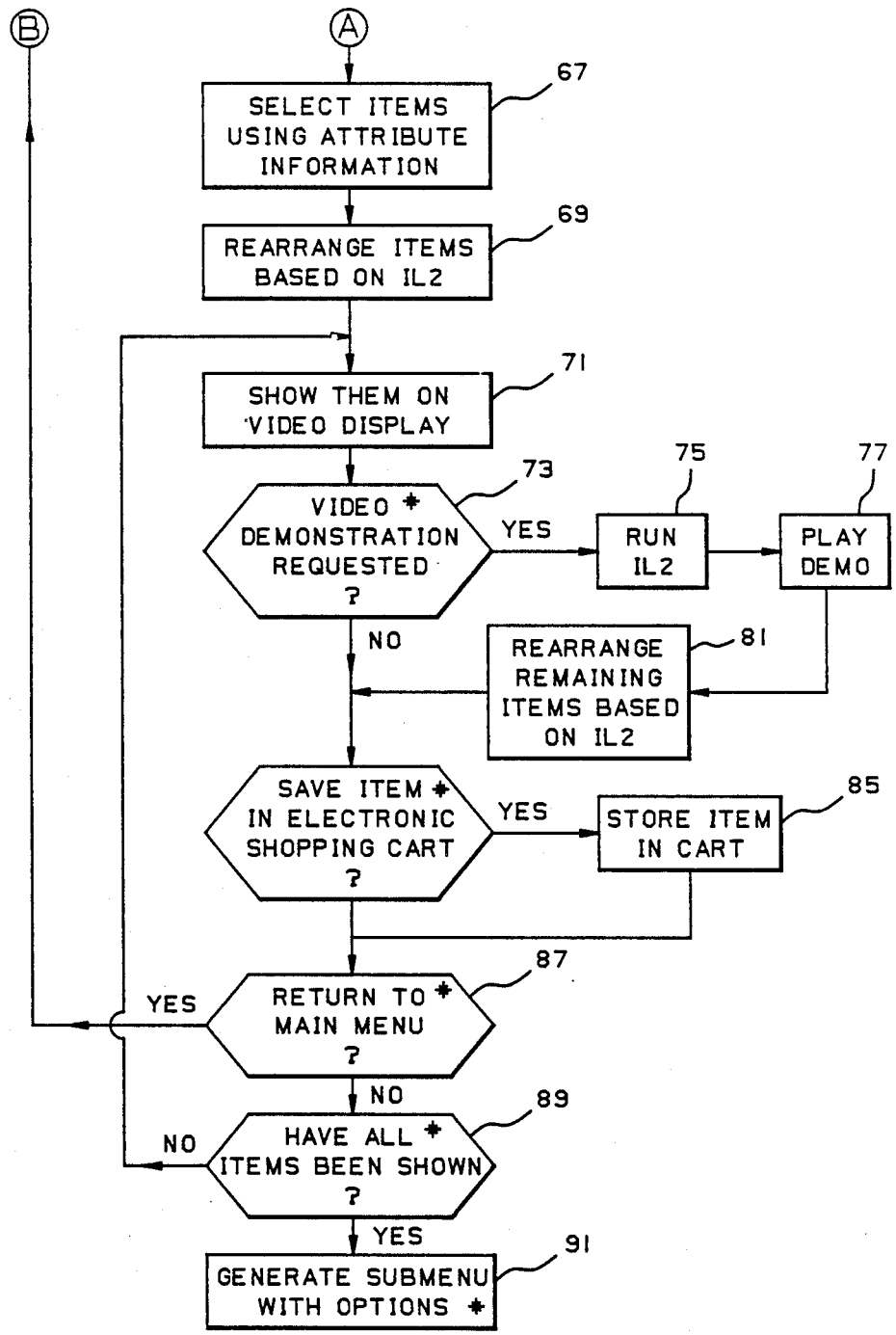
Figure 8:
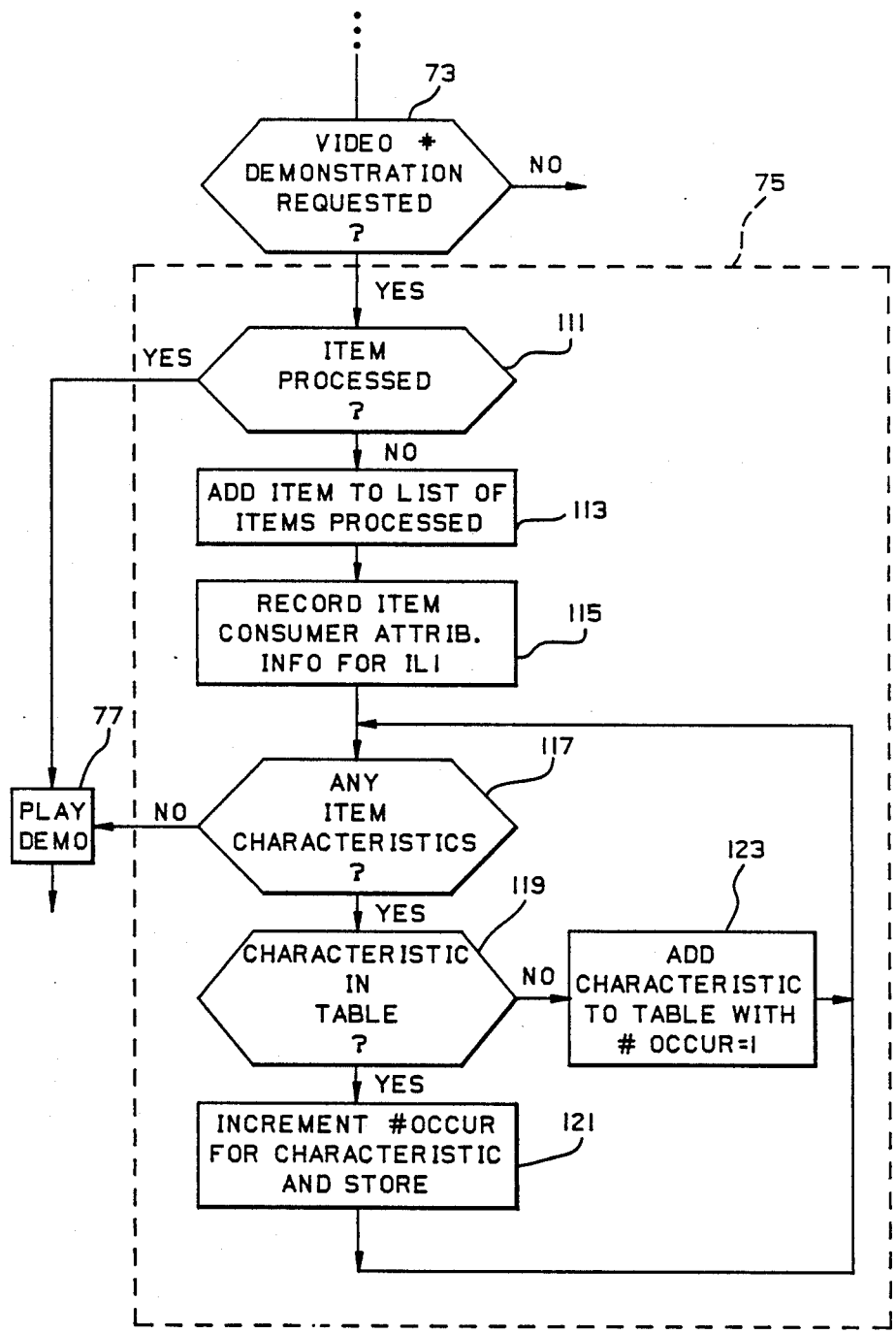
FIG. 8 is a flowchart of the software for executing the second level of inductive learning in accordance with the teachings of the invention.

FIG. 8 illustrates in more detail the flowchart of the IL 2 routine illustrated by the block 75 in FIG. 5b. First a check is made in block 111 to determine if the item has already been processed to prevent counting it twice. If the item has already been recorded for this user, the remainder of the IL 2 routine is bypassed and the demonstration is played in block 77. New items for this user session are added to the item list in block 113 and the consumer attribute information for the item is recorded for the first level of inductive learning, IL 1, in block 115. If the item being examined does not have any assigned functional characteristics as determined in block 117, the video demonstration is played. If the assigned functional characteristic is already listed in the table as determined in block 119, the number of occurrences of that characteristic is incremented in block 121. If it is a new characteristic, it is added to the table with the number of occurrences set equal to 1, as indicated in block 123. Since an item may be assigned more than 1 characteristic, this procedure is repeated for each characteristic assigned to the item under review. When all of the characteristics have been recorded, or if no functional characteristic has been assigned to the item, the IL 2 run routine is completed and the video demonstration is played in block 77.

Figure 9:
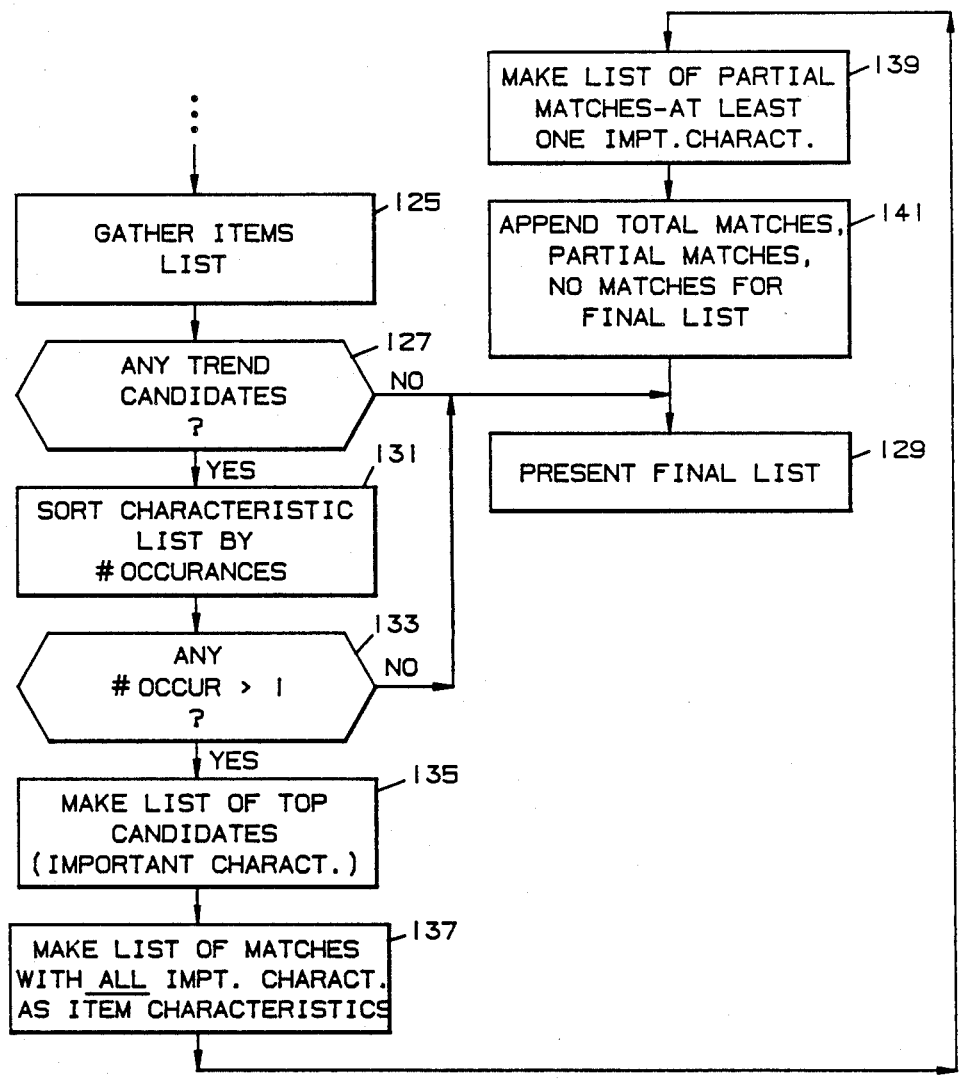
FIG. 9 is a flowchart of the software for rearranging the list of items presented to the user as directed by the second level of inductive learning.

FIG. 9 illustrates a flowchart for rearranging items in accordance with the second level of inductive learning, IL 2. First the list of items to be presented is gathered in block 125. Next, a check is made in block 127 to determine if there are any trend candidates, that is are there any entries in the occurrence of characteristic tables. If not, the list of items is presented as a final list in block 129 with the sequence unchanged. If there are any entries in the characteristic list, they are sorted by the number of occurrences in block 131. If none of the characteristics has occurred more than once as indicated in block 133, no significant trend has been detected and the list is not rearranged. If any characteristic has occurred more than twice, a list is made in block 135 of the top candidates. That is, a list of the characteristic or characteristics that have occurred the most number of times. Such characteristics are considered the important characteristic or characteristics. Next a list is made, block 137, of the items, if any, which match all of the important characteristics. A list is then made in block 139 of all of the items which have a partial match with the important characteristics. That is those items which are assigned at least one of the important characteristics. Finally a list is made, block 141, in which the item having a total match with the important characteristics followed by those items having a partial match are moved to the top of the list of selected items as ordered by the first level of inductive learning, IL 1. Items for which there is no match with the important characteristics remain in the sequence determined by IL 1. This rearranged list is then presented as the final list in block 129.

A number of the features discussed above make this system unique. First is the use of inductive learning techniques to teach the system items of interest by determining the most desirable attributes at any given time based upon the input of previous users. This allows the system to be truly sensitive to user interest and to respond appropriately. One significant advantage of this is that even after a pattern has developed, if a trend in shopping habits changes for some reason, the inductive learning program will detect this change and adjust the presentation accordingly. In addition, the system can tailor a presentation to the individual taste of the current user, again using an inductive learning program which is based upon a set of assigned attributes.

In addition to being responsive, the system is highly versatile. The versatility is achieved by reducing the product data base to a series of attributes based on extensive market research. The products are retrived solely by their attributes, permitting items to be added or deleted, or the whole data base to be changed, without significantly changing the computer code. This allows the system to be generic in that any type of items may be added to the catalog, and they will be retrived or sequenced using only their attribute values. Versatility is further enhanced by the system by the extensive use of automatic screen generation techniques such that most screens shown to the user are generated based upon the current user situation, making wording changes, option changes and formating changes trival an implementation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

Appendix

Figure 10A:
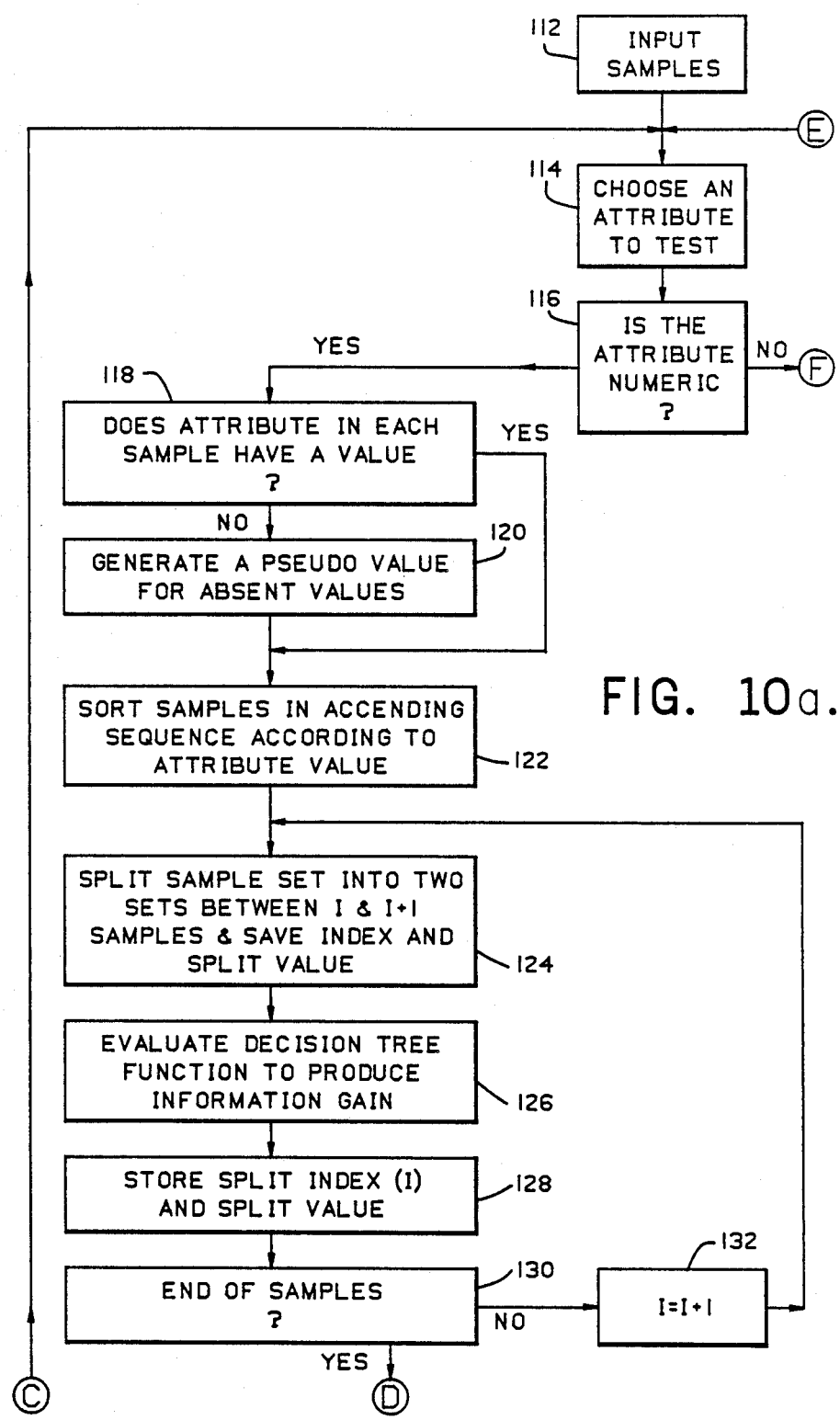
FIGS. 10a, 10b and 10c illustrate flowcharts of the software for the rule making algorithm used by the first level of inductive learning which is described in the appendix to this application.

A detailed flow chart of the ID3 program suitable for generating the decision trees which derive the rules for the first level of inductive learning used in the present invention is set forth and described in commonly owned U.S. patent application Ser. No. 826,524 filed on Feb. 6, 1986 in the names of William J. Leech and Thomas N. Dean and entitled "An Automated Rule Based Process Control Method with Feedback and Apparatus Therefore". This flow chart, which appears as FIGS. 8a and 6, and the description thereof which appears on pages 16-20 of that application, are repeated here as FIGS. 10a and b and the description below for the purpose of providing suitable means for implementing the ID3 rule making algorithm.

Figure 10B:
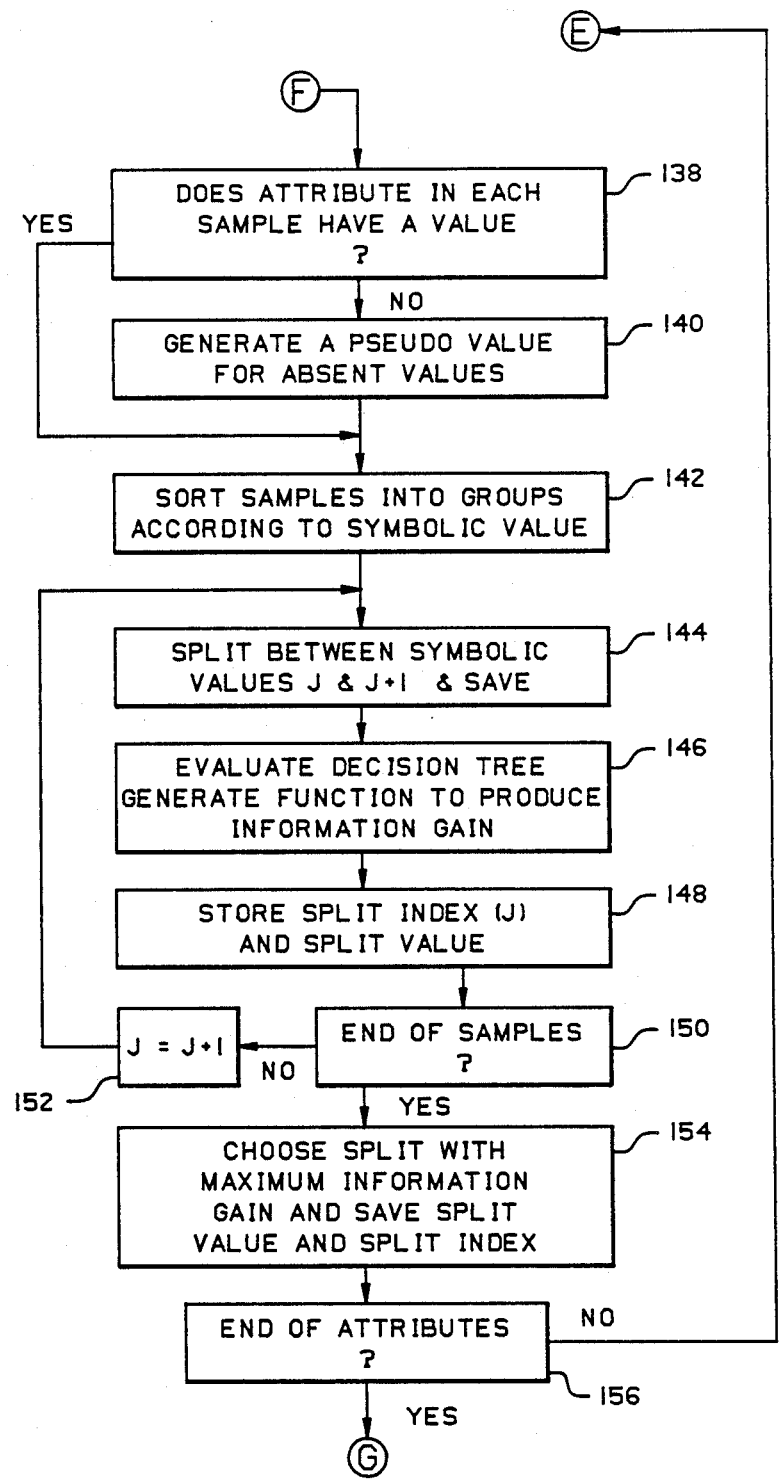
Figure 10C:
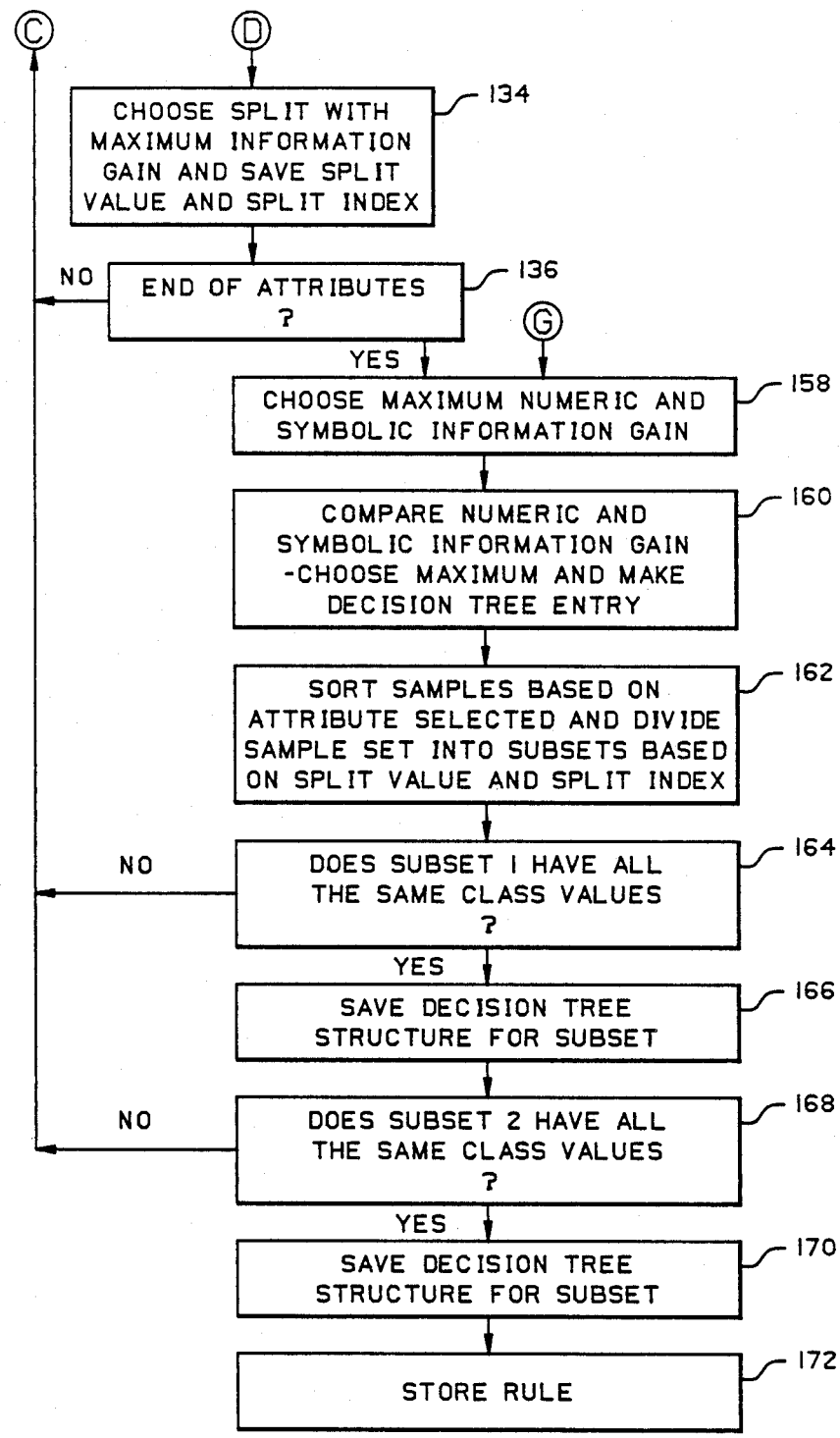

Once the sample set is selected, new rules are induced as illustrated in FIG. 10. First, the samples are input 112 and stored in a data structure, such as an array, matrix or list which is suitable for storing samples having multiple attributes where the samples must be sorted and subdivided during processing. Next, an attribute is chosen 114 for testing to determine whether it is an appropriate split node for the decision tree. The attribute to be tested can be chosen arbitrarily, such as choosing the first attribute in the sample. The attribute is tested 116 to determine whether it is numeric. Assuming that the attribute is numeric, a determination 118 is made concerning whether the attribute has a value in each sample. If each attribute does not have a value, a suitable value for that sample is generated 120 by, for example, averaging the attribute values or randomly picking an attribute value. Another strategy for handling absent values is to create pseudo samples to substitute for the sample with the missing attribute. The missing attribute value for the pseudo samples can be generated based on the distribution of the attribute values for other samples in the sample set or on a distribution such as a bell curve.

The records are sorted 122 in ascending sequence according to the attribute value for the attribute selected, and then the sample set is split 124 into two sets between the first and second samples producing a split value and a split index. Next, an information gain function for creating a decision tree is evaluated 126 to produce the information gain for the split previously selected. The information gain will be used to determine whether the tested attribute is appropriate as the split node for the current level in the decision tree. The calculations necessary to evaluate this preferred function will be discussed in detail later. The resulting information gain along with split values and split index are stored 128. If the last sample has not been reached 130, the index is advanced 132 and the sample set is split between the next two samples and the decision tree generation function is again evaluated. Once the end of the samples is reached, the split which produces the maximum information gain, along with the split value and split index, is saved 134. If the end of the attributes has not been reached 136, then the next attribute is chosen and the process continues again.

After a similar process is performed for each symbolic attribute, the numeric or the symbolic attribute having the highest information gain and the corresponding indices are chosen 158 by comparing the information gain for each attribute. Next, the maximum numeric and symbolic information gain values are compared 160 with each other, the attribute with the maximum is chosen and a decision tree record entry is created. The data structure of the decision tree will be discussed in more detail hereinafter.

After the maximum is chosen, the samples are again sorted 162, based on the selected attribute, into ascending sequence if numeric and according to symbolic name if symbolic. Then the sample set is divided into subsets based on the attribute with the maximum information gain and the corresponding split value and split index. If all the samples in each subset have the same class values, then the decision tree for the subset structure and the corresponding rule is saved. If each sample in a subset does not have the same class values, then the algorithm is then executed for the subset as if it were the set. That is, the subset is treated as a set and the process of choosing attributes, sorting into ascending sequence, splitting and producing the information gain is executed.

If during the execution of the above-discussed rules induction algorithm an attribute is encountered which requires the solution of a subproblem to produce a subrule, the subrule is produced in the same manner as previously described. In the preferred embodiment, the subproblems which appear in the primary problem are rule induced prior to primary problem rule induction, so that when a subproblem indicator is encountered, the rule for that subproblem can be made available immediately. An alternative to performing subproblem induction before primary problem induction, is to temporarily halt rules production based on the primary sample set while a rule is produced for a subproblem sample set. Either the preferred or alternate approach can be applied whenever a particular class value requires the solution of a subproblem.

What is claimed is:

1. A computer controlled video merchandising system for selectively sequentially presenting a visual display of a plurality of items to which a plurality of products attributes have been assigned, said system comprising:
    means for generating a record for each item including the assigned attributes;
    means for selecting a sequence for presenting a visual display of the items based upon the assigned attributes;
    means for presenting a visual display of said items in said selected sequence;
    means for a user to generate a user input in response to the visual display of a particular item; and
    means for rearranging said selected sequence based upon the assigned attributes of the particular items for which the user input was generated.

2. A method of controlling a video system with a programmed digital computer to display to users in a controllable sequence images of a plurality of items, said method comprising the steps of:
    generating an attribute file containing as to each item an assigned value for at least one selected attribute;
    establishing a list of said items sorted in the sequence to be presented by the video system based upon the assigned values of said at least one attribute;
    controlling said video system to display said items in the order of said list;
    providing means for users to generate inputs indicating interest in selected displayed items;
    generating a data file containing as to each user input the item selected and a recurring time period during which the input was generated;
    determining from the attribute file the assigned value of said at least one attribute for each of the selected items in the data file;
    determining from the recurring time periods of the inputs and the assigned values of said at least one attribute for the selected items the most frequent value of said at least one attribute during each recurring time period;
    as to the current time period, determining as to each item the match between the assigned value of said at least one attribute and the most frequent value of said at least one attribute during that time period; and
    resorting said list of items in descending order of said match between the assigned value and the most frequent value during the current time period of said attribute, whereby the sequence in which said items are displayed changes in accordance with the responses of users during the respective time periods.

3. The method of claim 2 wherein the step of determining the most frequent value of said at least one attribute comprises generating a rule from the recurring time periods in which the inputs are generated and the values of said attributes assigned to the selected items, and which rule groups together recurring time periods in which the most frequent values of said at least one attribute are the same.

4. The method of claim 3 wherein the step of generating said attribute file comprises generating such a file containing as to each item an ordered group of assigned values for said at least one attribute, wherein said step of determining the most frequent value of said at least one attribute during each recurring time period utilizes the highest order value of said attribute for the selected items, and wherein said matching step takes into account the order in which the most frequent value is assigned to said attribute for each item.

5. The method of claim 4 wherein each ordered value of each attribute for each item is assigned a numerical score, wherein the matching step comprises determining as to each item the numerical score assigned to the most frequent value of the attribute during the current time period, and wherein the resorting step comprises arranging the items in order of the numerical score of the most frequent value of the attribute for the current recurring time period.

6. A method of controlling a video system with a programmed digital computer to display to users in a controllable sequence images of a plurality of items, said method comprising the steps of:
    generating an attribute file containing as to each item an assigned value for each of a plurality of attributes;
    establishing a list of said items sorted in a sequence to be presented by the video system based upon the assigned values of said attributes;
    controlling said video recorder to display said items in the order of said list;
    providing means for users to generate inputs indicating interest in selected items;

generating a data file containing as to each user input the item selected and a recurring time period during which the input was generated;

determining from the attribute file the assigned value of each of said attributes for each of the selected items in the data file;

as to each of said attributes determining from the recurring time periods of the inputs and the assigned values of that attribute for each of the selected items, the most frequent value of that attribute during each recurring time period;

as to the current time period, determining as to each item the match between the assigned values of said attributes and the most frequent values of those attributes during that time period; and resorting said list of items in descending order of said match between the assigned values of the most frequent values during the current time period of said attributes, whereby the sequence in which said items are displayed changes in accordance with responses of users during respective time periods.

7. The method of claim 6 wherein the step of generating said attribute file comprises generating such a file containing as to each attribute for each item an ordered number of assigned values for said attribute, wherein said step of determining the most frequent value of each attribute during each recurring time period utilizes the highest ordered value of the attribute for the selected items, and wherein said matching step takes into account the order in which the most frequent value is assigned to that attribute for that item.

8. The method of claim 7 wherein each ordered value of each attribute for each item is assigned a numerical score, wherein the matching step includes determining for each item the sum of the numerical scores assigned to the most frequent value for all of the attributes, and wherein the step of resorting the items comprises rearranging the list in order of said sums of the numerical scores for each of the items.

9. The method of claim 8 wherein the step of determining the most frequent value of each of said attributes comprises generating a decision tree from the recurring time periods in which the inputs are generated and the highest ordered value of that attribute assigned to the selected items, said decision tree grouping together recurring time periods in which the most frequent value of each of said attributes are the same.

10. The method of claim 6 wherein said attributes are user profile attributes and wherein said resorting step in only carried out between users, said method further including generating an item characteristic file containing at least one item characteristic for at least some of said items, determining the item characteristics which occur the most times in items selected by the current user, and for said current user, revising said list to move the items assigned the item characteristics which occur most to the top of said resorted list.

11. A system for sequentially displaying to a number of successive users merchandise items to which a plurality of attribute values indicative of the appeal of the item to selected classifications of users during a plurality of recurring time periods have been assigned, said system comprising:

a video recorder in which images of said items are stored;

a video monitor on which said stored images are selectively displayed;

interface means by which users generate inputs identifying displayed items in which they are interested; and a digital computer programmed; to record the items identified by the inputs and a recurring time period during which each input was generated, to apply an inductive learning algorithm to the attribute values of the selected items to determine the most likely attribute values of items selected by users during each of said recurring time periods, and to select the sequence in which the images stored in the video recorder are displayed on said video monitor in descending order of a match between the attribute values assigned to each item and said most likely attribute values for the current recurring time period.

12. The system of claim 11 wherein said merchandise items are also assigned item characteristics and wherein said computer is programmed to apply a first inductive learning algorithm to said attribute values of items identified by inputs by all users only between inputs by separate users, to apply a second inductive learning algorithm to said item characteristics assigned to items selected by the current user to determine the item characteristics most appealing to the current user, and to adjust said selected sequence in which the items are displayed to the current user only, to present first to the current user items assigned the item characteristics most appealing to the current user.

13. A computer based method for sequentially presenting on a video monitor, images of items stored in a video recorder, comprising the steps of:

storing in said computer assigned user profile attribute values and item function attributes for said items;

sorting said items to generate an ordered list of the items based upon the assigned user profile attribute values, displaying on said video monitor the stored images in the order established by said list;

providing means for a user to generate an input indicating an interest in a particular item;

resorting the items on said list for each new user based upon the assigned values of the user profile attributes for the items identified by the previous users;

selecting only for the current new user, items having assigned item function attributes which exhibit a predetermined match with the item function attributes of other items selected by said current new user; and displaying the stored images of said selected items on said video monitor before the other items on said ordered list.

14. A computer based method for sequentially presenting on a video monitor, images of items stored on a videodisc comprising the steps of:

establishing in the computer a list of said items sorted in a sequence to be presented on the video monitor;

sorting in the computer at least on assigned item characteristic attribute for at least some of said items on said stored list of items; displaying on said video monitor the images stored on said videodisc in the order established by said sorted list;

providing means for a user to generate an input indicating an interest in a particular item;

generating an item characteristic attribute occurrence list containing the number of occurrences of each item characteristic attribute assigned to items for which a user input has been generated; and revising said sorted list by moving to the top of the sorted list those items having item characteristic attributes having the most number of occurrences.

15. The method of claim 14 including the step of clearing old entries from the item characteristic attribute occurrence list for each new user.

16. The method of claim 15 wherein said revising step comprises moving to the top of said ordered list items assigned each of the item characteristic attributes which have the most number of occurrences followed in order by items which have the most to the least number of said item characteristic attributes which have the most occurrences.

* * * * *